(12) United States Patent
Iglesias et al.

(10) Patent No.: US 12,504,809 B2
(45) Date of Patent: Dec. 23, 2025

(54) GAZE-BASED CONTROL

(71) Applicant: Apple Inc., Cupertino, CA (US)

(72) Inventors: Samuel L. Iglesias, Palo Alto, CA (US); Mark A. Ebbole, Austin, TX (US); Andrew P. Richardson, San Francisco, CA (US); Tyler R. Calderone, Cupertino, CA (US); Michael E. Buerli, San Francisco, CA (US); Devin W. Chalmers, Oakland, CA (US)

(73) Assignee: Apple Inc., Cupertino, CA (US)

( * ) Notice: Subject to any disclaimer, the term of this patent is extended or adjusted under 35 U.S.C. 154(b) by 1014 days.

(21) Appl. No.: 17/187,717

(22) Filed: Feb. 26, 2021

(65) Prior Publication Data
US 2021/0325960 A1    Oct. 21, 2021

Related U.S. Application Data

(60) Provisional application No. 63/011,975, filed on Apr. 17, 2020.

(51) Int. Cl.
G06F 21/36    (2013.01)
G06F 3/01    (2006.01)
G06V 40/19    (2022.01)

(52) U.S. Cl.
CPC .............. *G06F 3/013* (2013.01); *G06F 21/36* (2013.01); *G06V 40/19* (2022.01)

(58) Field of Classification Search
CPC ........ G06F 3/013; G06F 21/36; G06F 3/0481; G06F 3/0484; G06F 3/04842; G06F 21/31; G06F 3/048; G06F 3/012; G06F 3/011; G06V 40/19; G06V 40/18
See application file for complete search history.

(56) References Cited

U.S. PATENT DOCUMENTS

| | | | |
|---|---|---|---|
| 9,355,612 | B1 | 5/2016 | Shepard |
| 9,727,135 | B2 | 8/2017 | Sellen et al. |
| 9,854,967 | B2 | 1/2018 | Kimura et al. |
| 9,880,384 | B2 | 1/2018 | Wilson et al. |

(Continued)

FOREIGN PATENT DOCUMENTS

| | | |
|---|---|---|
| CN | 107087431 A | 8/2017 |
| CN | 108271021 A | 7/2018 |

(Continued)

OTHER PUBLICATIONS

Invitation to Pay from PCT/US2021/023446, dated Jun. 29, 2021, 16 pages.

(Continued)

*Primary Examiner* — Rayeez R Chowdhury
(74) *Attorney, Agent, or Firm* — BAKERHOSTETLER

(57) ABSTRACT

Aspects of the subject technology relate to gaze-based control of an electronic device. The gaze-based control can include enabling an option to provide user authorization when it is determined that the user has viewed and/or read text associated with a request for the user authorization. The gaze-based control can also include modifying a user interface or a user interface element based on user views and/or reads. The gaze-based control can be based on determining whether a user has viewed and/or read an electronic document and/or a physical document.

29 Claims, 11 Drawing Sheets

(56) References Cited

U.S. PATENT DOCUMENTS

| | | | |
|---|---|---|---|
| 10,013,053 B2 | 7/2018 | Cederlund et al. | |
| 10,063,560 B2 | 8/2018 | Gordon et al. | |
| 10,324,528 B2 | 6/2019 | Cederlund et al. | |
| 10,996,748 B2 | 5/2021 | Agaoglu et al. | |
| 2005/0166148 A1* | 7/2005 | Garding | G06F 9/453 |
| | | | 715/708 |
| 2006/0203093 A1* | 9/2006 | Trulaske | H04N 1/1008 |
| | | | 348/156 |
| 2009/0273562 A1 | 11/2009 | Baliga | |
| 2010/0091200 A1 | 4/2010 | Vigouroux | |
| 2011/0016164 A1* | 1/2011 | Maeshima | G06F 16/51 |
| | | | 707/813 |
| 2012/0088543 A1* | 4/2012 | Lindner | G06F 40/58 |
| | | | 704/260 |
| 2012/0133595 A1* | 5/2012 | Lippolis | G06F 3/04883 |
| | | | 345/173 |
| 2012/0290401 A1 | 11/2012 | Neven | |
| 2012/0323796 A1* | 12/2012 | Udani | G16H 10/20 |
| | | | 705/80 |
| 2013/0027302 A1* | 1/2013 | Iwaizumi | G06F 1/1686 |
| | | | 345/158 |
| 2014/0247232 A1* | 9/2014 | George-Svahn | G06F 3/012 |
| | | | 345/184 |
| 2015/0178889 A1 | 6/2015 | Michel | |
| 2017/0318019 A1* | 11/2017 | Gordon | G06V 40/67 |
| 2017/0346817 A1 | 11/2017 | Gordon et al. | |
| 2018/0357728 A1* | 12/2018 | Huening | H04L 67/535 |
| 2019/0137857 A1* | 5/2019 | Sugawara | G16H 20/40 |
| 2020/0066004 A1 | 2/2020 | Vines et al. | |
| 2020/0148382 A1* | 5/2020 | Tanabe | G08G 1/005 |
| 2021/0081953 A1* | 3/2021 | Rakshit | G06Q 20/405 |
| 2021/0118410 A1* | 4/2021 | Grieves | G09G 5/373 |

FOREIGN PATENT DOCUMENTS

| | | |
|---|---|---|
| KR | 2012-0058947 A | 6/2012 |
| KR | 2015-0005131 A | 1/2015 |

OTHER PUBLICATIONS

International Search Report and Written Opinion from PCT/US2021/023446, dated Aug. 19, 2021, 20 pages.

Gunduz et al., "Analysis Eye Movements During Reading by Machine Learning Algorithms: A Review Paper," IEEE Symposium Series on Computational Intelligence (SSCI), Nov. 2018, pp. 1069-1075.

European Office Action from European Patent Application No. 21718724.4, dated Sep. 4, 2023, 10 pages.

European Office Action from European Patent Application No. 21718724.4, dated Feb. 28, 2024, 6 pages.

European Office Action from European Patent Application No. 21718724.4, dated Aug. 22, 2024, 11 pages.

Korean Office Action from Korean Patent Application No. 10-2022-7035651, dated Jan. 9, 2025, 38 pages with translation.

Korean Office Action from Korean Patent Application No. 10-2022-7035651, dated Jun. 16, 2025, 11 pages with translation.

Chinese Patent Application No. 202180028325.9; Office Action dated Jul. 26, 2025, 30 pages with English translation.

* cited by examiner

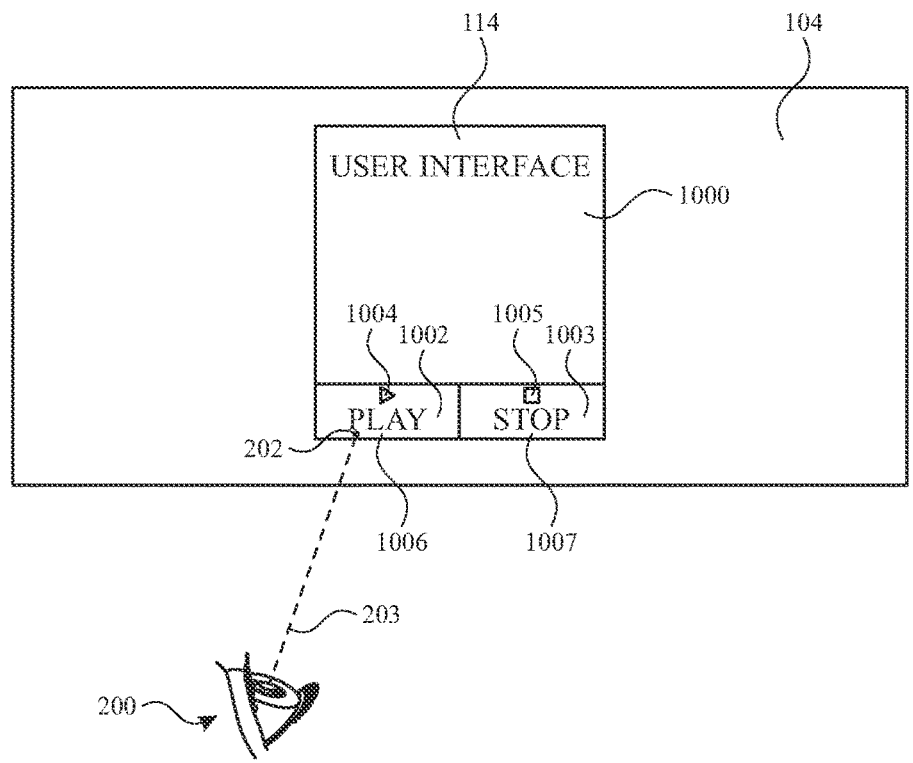
*FIG. 10*
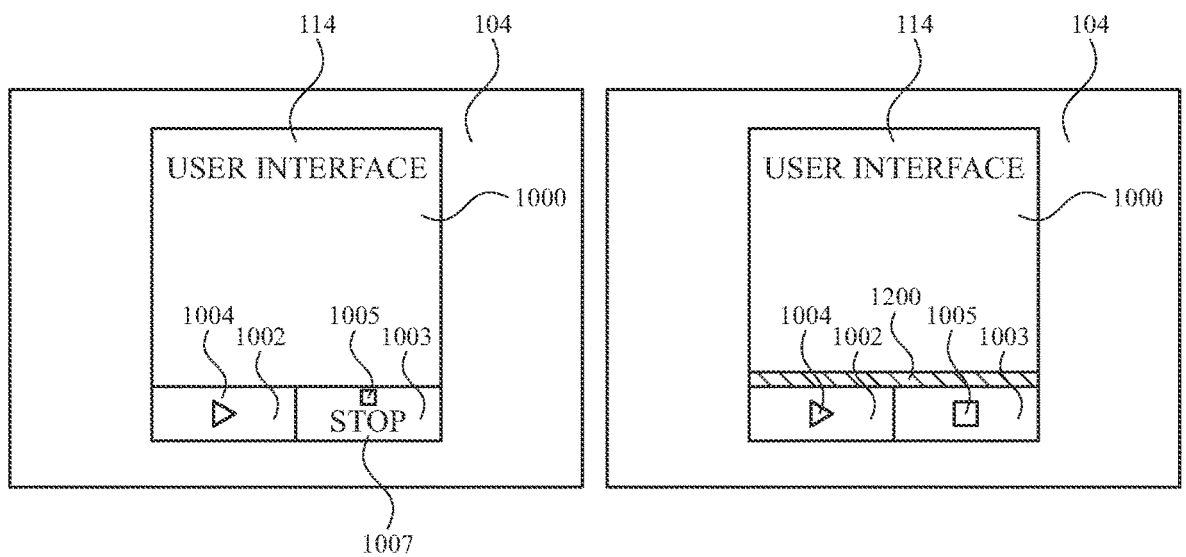
*FIG. 11*          *FIG. 12*

GAZE-BASED CONTROL

CROSS REFERENCE TO RELATED APPLICATIONS

This application claims the benefit of priority to U.S. Provisional Patent Application No. 63/011,975, entitled "Gaze-Based Control," filed on Apr. 17, 2020, the disclosure of which is hereby incorporated herein in its entirety.

TECHNICAL FIELD

The present description relates generally to electronic devices, and more particularly, but not exclusively, to gaze-based control for electronic devices.

BACKGROUND

Portable electronic devices such as laptop computers, cellular telephones, and tablet computers are often provided with displays for displaying visual information. These portable devices often require a user to authorize an action before the device takes the action.

BRIEF DESCRIPTION OF THE DRAWINGS

Certain features of the subject technology are set forth in the appended claims. However, for purpose of explanation, several embodiments of the subject technology are set forth in the following figures.

FIG. 10 illustrates an example user interface being viewed by a user in accordance with various aspects of the subject technology.

FIG. 11 illustrates an example of the user interface of FIG. 10 in which the user interface has been modified based on user gaze locations in accordance with various aspects of the subject technology.

FIG. 12 illustrates another example of the user interface of FIG. 10 in which the user interface has been modified based on user gaze locations in accordance with various aspects of the subject technology.

DETAILED DESCRIPTION

Figure 1:
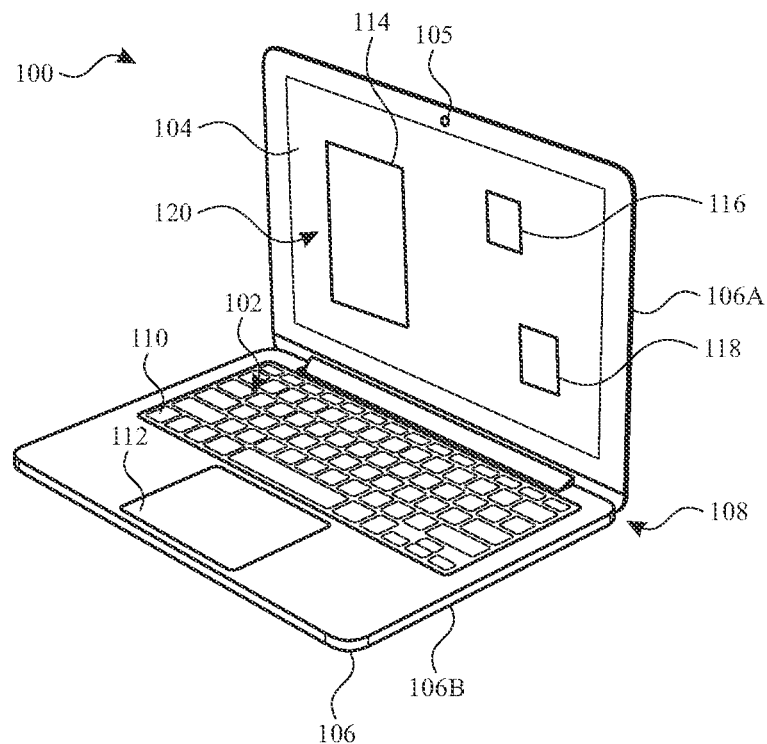
FIG. 1 illustrates a perspective view of an example electronic device in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides systems and methods for controlling an electronic device based, in part, on whether a user of the device has viewed and/or read textual information, such as textual information being displayed by the device (or another device), or textual information included on a physical document being viewed by the user of the device. The device can determine whether the user has viewed and/or read the textual information using eye-tracking data from one or more eye trackers on the device and/or another device. The eye-tracking data can include gaze information, such as gaze locations and/or gaze directions for one or both of the user's eyes. The gaze information can indicate where and when the user looked at various locations, such as locations on a display of the device, and/or how the user's eye(s) have moved over time.

Various aspects of the electronic device can be controlled based on this gaze information. In one example, the gaze information can be used to confirm that the user has viewed and/or read text that has been presented to the user, before the user can authorize an action by the device. For example, to prevent a user from inadvertently deleting data from memory of the device, the device may present a dialog box that includes text such as "Are you sure you want to delete this file?".

In a conventional device, this kind of text is often provided with a "Yes" button to authorize the deletion, and a "No" button that can be selected to decline the deletion. However, a user that may have inadvertently instructed the device to delete the file and is busy working on the device, or is otherwise distracted, may select the "Yes" button without having read the text of the dialog box. In these circumstances, the deleted data can be lost, which can cause user frustration, delay, and/or inefficiency, as well as wasting processing and/or memory resources of the device, such as resources used to delete the data and/or resources used to recreate the unintentionally deleted data.

The systems and methods disclosed herein can be applied to confirm that the user has viewed and/or read the text in the dialog box, before allowing the user to select an option to authorize the deletion.

The systems and methods disclosed herein can also be applied to determine whether a user has viewed and/or read other information before allowing the user to authorize various device actions. As examples, an electronic device can determine whether a user of the device has viewed and/or read text associated with allowing access to personal data, text associated with allowing access to one or more components of the device, text associated with allowing installation of software on the device, and/or text corresponding to one or more terms and/or conditions, before allowing the user to authorize the associated action.

The systems and methods disclosed herein can also be applied to modify the operation of the device based on a determination of whether and/or when the user has viewed and/or read textual information. For example, text that forms a portion of a user interface or other device display screen can be removed from the user interface or display screen after the user has viewed and/or read the textual information a predetermined number of times. As another example, a user interface element such as a widget that displays time-dependent information can be updated with a frequency that depends on the frequency with which the user views the user interface element.

An illustrative electronic device that can implement the technique described herein is shown in FIG. 1. In the example of FIG. 1, device 100 has been implemented in the form of a portable computer. As shown in FIG. 1, electronic device 100 may include keyboard 102 with keys 110, display 104, housing 106, and a touch pad such as touch pad 112. As shown in FIG. 1, display 104 may be mounted on the front of housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 may be formed using a unibody configuration in which some or all of housing 106 is machined or molded as a single structure or may be formed using multiple structures (e.g., an internal frame structure, one or more structures that form exterior housing surfaces, etc.). As shown in FIG. 1, housing 106 may have multiple parts. For example, housing 106 may have upper portion 106A and lower portion 106B. Upper portion 106A may be coupled to lower portion 106B using a hinge that allows upper portion 106A to rotate about rotational axis 108 relative to lower portion 106B. Keyboard 102 and touch pad 112 may be mounted in lower portion 106B, in some implementations.

Display 104 may be a touch screen that incorporates capacitive touch electrodes or other touch sensor components or may be a display that is not touch-sensitive. Display 104 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Display 104 may have openings (e.g., openings in the inactive or active portions of display 104) such as an opening to accommodate a button or one or more cameras such as camera 105. Camera 105 and/or other cameras disposed around or behind the display may be operated by electronic device 100 to capture images of the user's face, one or both of the user's eyes, and/or one or more features of one or both of the user's eyes.

Images captured by camera 105 and/or other cameras (e.g., cameras located at or near the corners of display 104) may be processed by processing circuitry within electronic device 100 to detect the user's eyes and determine the location and/or direction of the user's gaze relative to the camera, relative to display 104 and/or locations away from display 104 and/or relative electronic device 100. For example, the processing circuitry can determine the user's gaze location relative to text in an electronic document displayed by the display, relative to one or more portions of a user interface or user interface element displayed by the display, and/or relative to text in a physical document that is separate from electronic device 100.

Camera 105 and the associated processing circuitry may form an eye tracker for electronic device 100 that may be configured to track the gaze location and/or motions of the user's eye(s) at various times and/or over time. An eye tracker may include a single camera (e.g., an infrared camera or a visible light camera) with a field of view configured to include the location of a user's eye(s), multiple such cameras, and/or one or more additional sensors such as head-mounted sensors, near infrared projectors and the like.

The configuration of electronic device 100 in the example of FIG. 1 is merely illustrative. In other implementations, electronic device 100 may be implemented in the form of a computer such as a computer that is integrated into a display such as a computer monitor, a tablet computer, a smart phone, a somewhat smaller portable device such as a wrist-watch device, pendant device, or other wearable or miniature device, a media player, a gaming device, a navigation device, a computer monitor, a television, or other electronic equipment. In another example that is discussed in further detail hereinafter (see, e.g., FIG. 3), electronic device 100 may be implemented as a head-mountable device. In various configurations, electronic device 100 may be communicatively coupled to one or more cameras and/or other eye tracker sensors that are separate from the electronic device.

As shown in FIG. 1 display content 120 may be displayed by display 104 (e.g., by operating an array of display pixels according to corresponding digital pixel values in the display frame). In the example of FIG. 1, display content 120 includes an application display window 114, a dialog box 116, and a user interface element 118.

For example, application display window 114 may be a user interface window of a word processor, a compiler, a presentation editor, a spreadsheet, an image viewer, a file manager, a web browser, a video player, an audio player, a browser, or generally any user interface window. Application display window 114 may display an electronic document for review and/or editing by the user of electronic device 100. In one example, application display window 114 displays an electronic document being edited by the user. In another example, application display window 114 displays a terms and conditions document to be read by the user.

Dialog box 116 may be a dialog box for requesting user authorization for an action to be performed by electronic device 100 (e.g., by processing circuitry of the electronic device). The user authorization may be a user authorization for an action related to application display window 114 (e.g., an action such as closing a document or other editable data structure without saving changes, accepting terms and conditions described in an electronic document, deleting data from memory of electronic device 100, allowing access to data stored by electronic device 100, allowing access to one or more components of electronic device 100, allowing access to personal information of the user), authorizing an ecommerce and/or NFC transaction, or generally any action. Dialog box 116 may be a pop-up window that is displayed responsive to a user request for action by electronic device 100 and/or responsive to an automated action (e.g., a software update, an attempt by an application to access information, etc.). Although dialog box 116 is displayed separately from application display window 114 in the example of FIG. 1, it should be appreciated that dialog box 116 can be generated over, within, and/or as an integral part of application display window 114 in other examples.

User interface element 118 may be a widget, such as a clock widget, a calendar widget, a news feed widget, a weather widget, a stock ticker widget, etc., that displays time-dependent information.

Figure 2:
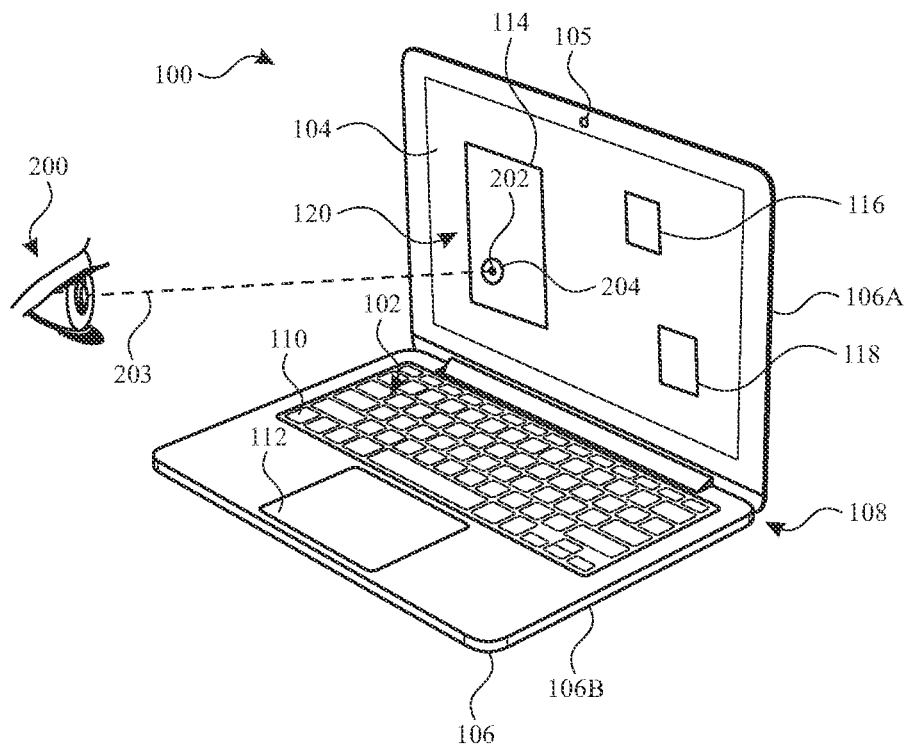
FIG. 2 illustrates a perspective view the electronic device of FIG. 1 being viewed by a user at a gaze location in accordance with various aspects of the subject technology.

In accordance with aspects of the subject disclosure, electronic device 100 controls one or more actions associated with an application based on one or more gaze locations for one or both of the user's eyes, as illustrated in FIG. 2.

As shown in FIG. 2, the gaze direction 203 of a user such as user 200 can be determined by electronic device 100 to intersect with a physical or virtual object, such as display 104, at a gaze location 202. Images of user 200 (e.g., infrared and/or visible light images of one or more eyes of the user) captured by camera 105 and/or other sensors (e.g., depth sensors that determine the distance between the user's eye(s) and camera 105) may be used to determine gaze location 202. In circumstances in which the gaze location 202 is a location on display 104, the gaze location 202 may be determined in terms of the coordinates of a pixel or group of pixels 204 of the display. Based on the determined gaze location 202, electronic device 100 may control one or more aspects of application display window 114, dialog box 116, and/or user interface element 118. Because electronic device 100 controls the locations at which display content 120 is displayed, gaze locations 202 in pixel coordinates can be determined relative to the displayed content.

In the example of FIG. 2, gaze location 202 is within the boundary of application display window 114. In some circumstances, the operation of an application associated with application display window 114, and/or the appearance of application display window 114 can be controlled based on gaze location 202. For example, application display window 114 can be visually highlighted or activated from an inactive state when gaze location 202 is located within the boundary of application display window 114 and/or dwells within the boundary of application display window 114 for a predetermined period of time (e.g., several milliseconds, tens of milliseconds, or hundreds of milliseconds). In some circumstances, one or more sub-portions of application display window 114 can be modified and/or otherwise controlled based on gaze location 202.

Dialog box 116 may be displayed to request user authorization for one or more actions by electronic device 100. For example, a user may have unsaved edits to an electronic document in application display window 114 and may input a request to close the document. In order to prevent the user from losing desired edits to the document by closing the document without saving the document, electronic device 100 may provide dialog box 116 with text such as "Are you sure you want to close without saving?". In order to help reduce the possibility that the user unintentionally agrees to close the document without saving (e.g., by clicking a selectable option to authorize the closing without saving, without having viewed or read the text in dialog box 116), eye tracking data such as one or more gaze locations 202 may be used to determine whether the user has viewed and/or read the text in dialog box 116.

Figure 3:
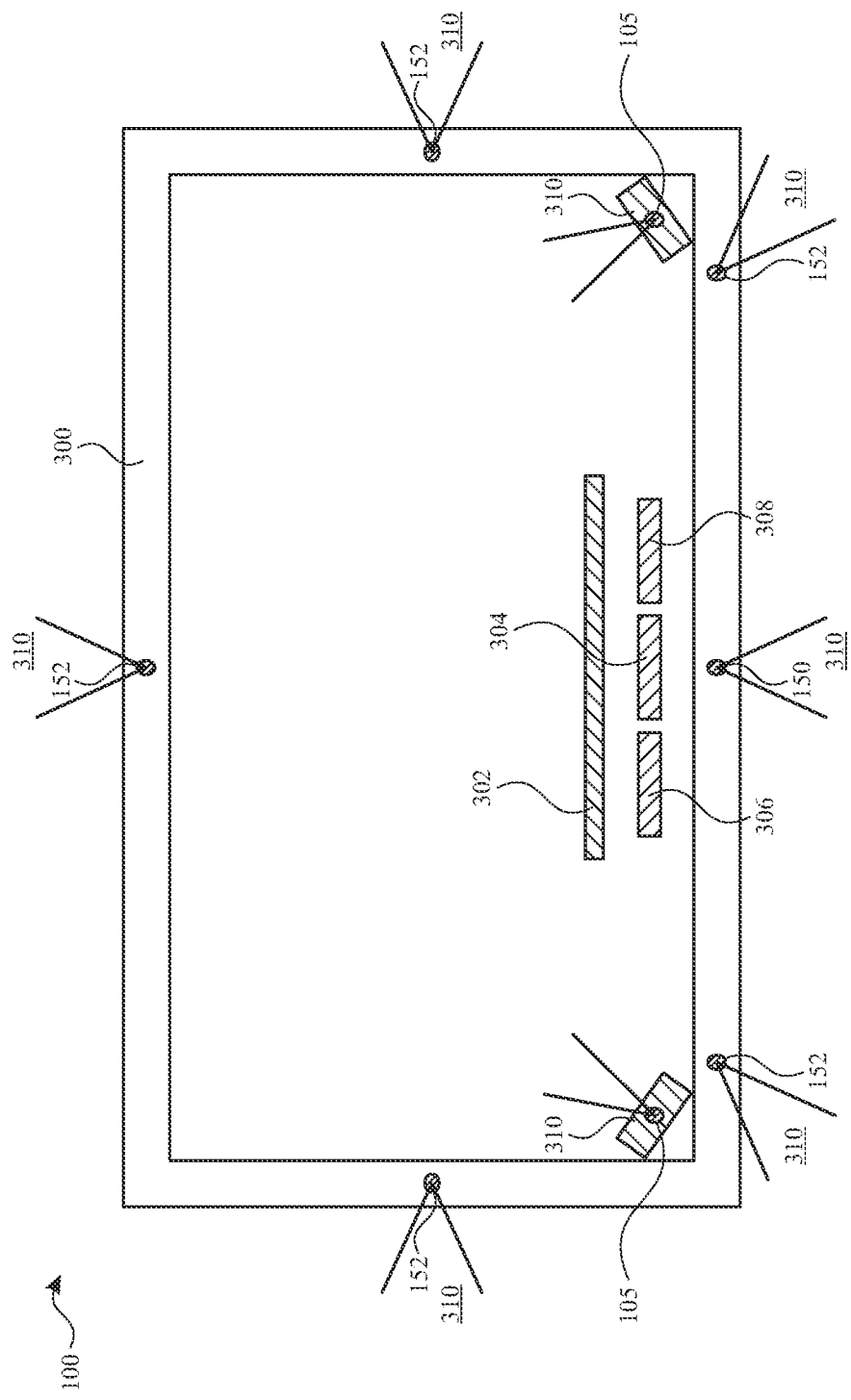
FIG. 3 illustrates an example of another implementation of an electronic device in accordance with various aspects of the subject technology.

As discussed above in connection with FIG. 1, the example of FIGS. 1 and 2 in which electronic device 100 is implemented as a laptop computer is merely illustrative. For example, FIG. 3 illustrates another example implementations of electronic device 100. As shown in the example of FIG. 3, one or more sensors such as sensors 152 may be positioned at various locations on or within a body 300 of electronic device 100. Body 300 may be arranged to secure the electronic device 100 to the user (e.g., to the head of the user) such that display 104 is positioned between the user's eyes and a view of the environment of electronic device 100.

In this example, display 104 may be an opaque display that prevents a user from directly viewing some or all of the environment around electronic device 100 or can be a transparent or translucent display that allows the user to directly view portions of the environment around electronic device 100 through the display. In implementations in which display 104 is an opaque display that blocks a direct view of the environment, one or more cameras such as camera 150 can provide a pass-through video view of the environment to display 104 in some operational scenarios. In implementations in which display 104 is a transparent or translucent display, display 104 may overlay display content over a direct view of a portion of the physical environment.

A transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As shown, electronic device 100 may include one or more sensors such as sensors 152. Sensors 152 may include, but are not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.. Sensors 152 and/or one or more cameras such as camera 150, each having a field of view may be positioned to enable capture of images and/or three-dimensional information (e.g., depth information) for the environment around electronic device 100.

Processing circuitry 306 (e.g., one or more processors and memory) and/or local processing circuitry of eye trackers 310 including camera(s) 105 may obtain eye tracking information and determine one or more gaze locations, directions, and/or motions of one or both eyes of a user. One or more internal sensors 304 such as IMUs, and/or one or more power sources 302 (such as a battery 308) can also be provided in electronic device 100 and electrically and/or communicatively coupled to processing circuitry 306.

Figure 4:
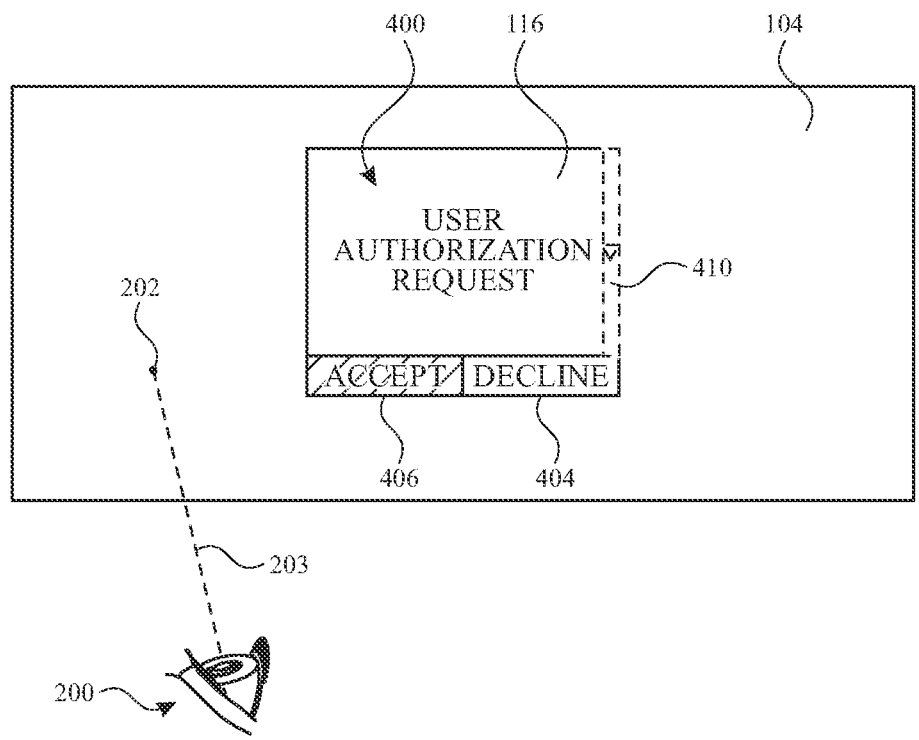
FIG. 4 illustrates an example of a user authorization request in accordance with various aspects of the subject technology.

Processing circuitry 306 may control various aspects of the operation of electronic device 100 based on the eye tracking data from eye trackers 310. For example, FIG. 4 illustrates a dialog box 116 displayed by display 104, and including text 400 of a user authorization request. The user authorization request in text 400 may be, as examples, a request for user authorization to delete data from the electronic device 100, a request for user authorization to allow access to data (e.g., contacts data, calendar data, a password, photos, videos, etc.) stored by the electronic device 100, a request for user authorization to allow access to a component (e.g., a camera, a sensor, etc.) and/or otherwise change a security setting of the electronic device 100, a request for user authorization to accept terms and conditions in a document displayed by the electronic device, and/or a request for user authorization to perform an ecommerce and/or NFC transaction. As shown in the example of FIG. 4, dialog box 116 may include a scroll bar (e.g., to scroll text 400 if text 400 is too long to be displayed on a single screen). In some implementations, electronic device 100 may prevent scrolling of a document by the user if it is determined that a current gaze location 202 is not within a text portion of the document (e.g., if gaze location 202 is not within the boundary of dialog box 116, over text 400, and/or indicating reading movements of the user's eye(s), use of scroll bar 410 may be disabled). The user authorization request in text 400 may be, as other examples, a request for user authorization to install software on electronic device 100, restore factory settings for electronic device 100, couple a remote device to electronic device 100, and/or the like.

As shown in the example of FIG. 4, the request for user authorization (e.g., as provided in a dialog box 116) may include a selectable option 404 to decline the authorization. Selectable option 404 to decline the authorization may be provided independent of the user's gaze location 202. As shown in the example of FIG. 4, the request for user authorization may be provided with a deactivated option 406 to provide the user authorization.

The deactivated option 406 to provide the user authorization may be provided when the gaze location 202 is outside the boundary of dialog box 116, not over text 400, and/or (e.g., along with additional previous gaze locations) does not indicate that text 400 has been read. Deactivated option 406 may be provided with the initial request for user authorization, prior to determining whether text 400 has been viewed and/or read.

As illustrated by FIG. 4, electronic device 100 may provide a selectable option 500 to provide the user authorization after it is determined that gaze location 202 indicates that text 400 has been viewed and/or read by the user. Gaze location 202 can indicate that text 400 has been viewed if gaze location 202 is within the boundary of dialog box 116 (e.g., instantaneously or for a predetermined period of time) and/or is located over text 400 (e.g., instantaneously or for a predetermined period of time). Gaze location 202 can indicate that text 400 has been read if multiple gaze locations 202 over time indicate motion of the gaze location along lines of text 400 and/or reading movements of the user's eyes. Reading movements that can be indicated by gaze locations 202 include saccades and fixations.

Figure 5:
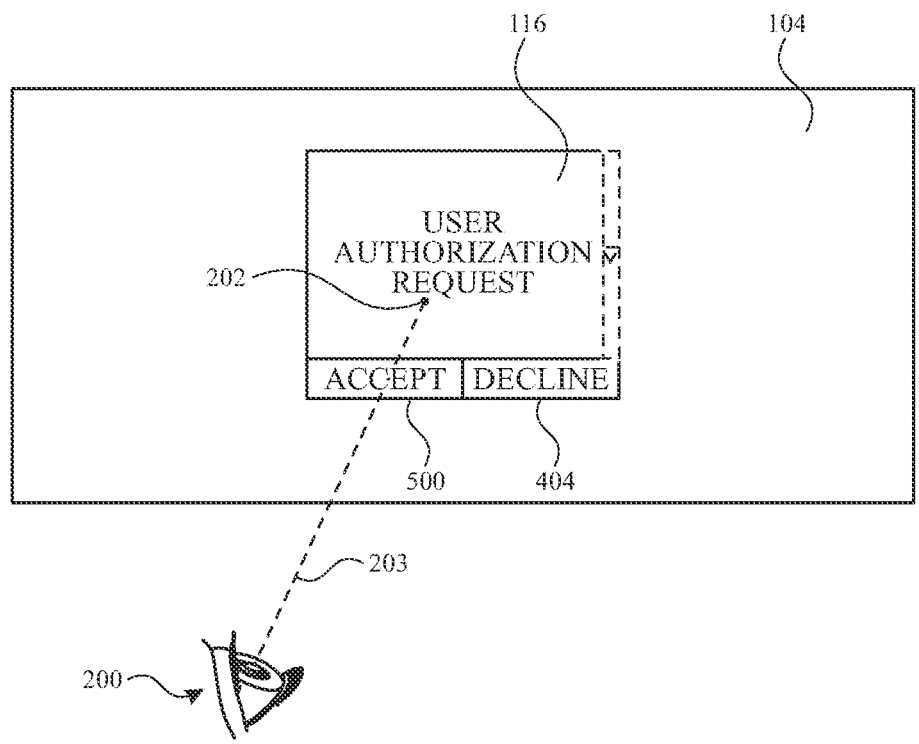
FIG. 5 illustrates the user authorization request of FIG. 4 being viewed and/or read by a user in accordance with various aspects of the subject technology.

In the example of FIGS. 4 and 5, deactivated option 406 is enabled or activated to provide selectable option 500 to provide user authorization. However, this is merely illustrative. In other examples, dialog box 116 can provide text 400 requesting user authorization and selectable option 404 to decline the user authorization, without providing a deactivated option to provide the user authorization. In this example, when it is determined that the user has viewed and/or read text 400, selectable option 500 can be added to dialog box 116.

Figure 6:
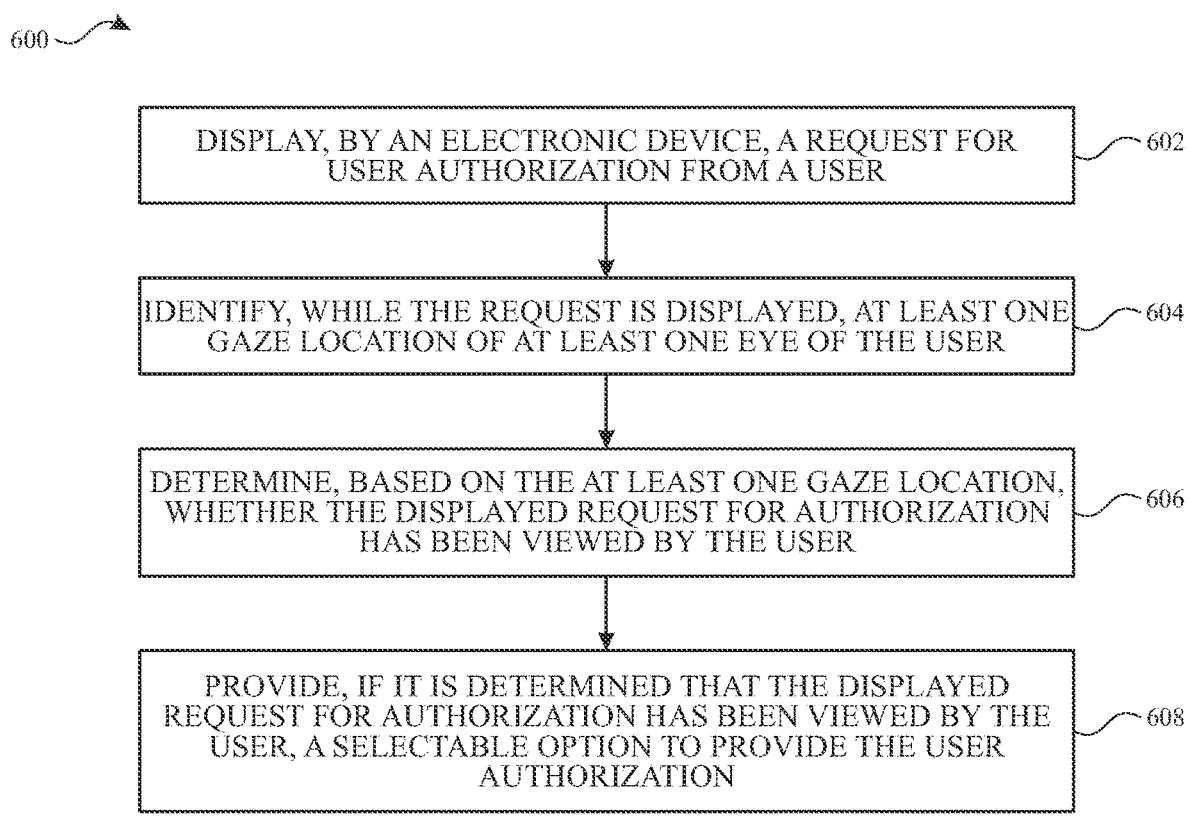
FIG. 6 illustrates a flow chart of an example process for gaze-based control of user authorization in accordance with various aspects of the subject technology.

FIG. 6 is depicts a flow diagram of an example process 600 for gaze-based control of user authorization in accordance with various aspects of the subject technology. For explanatory purposes, the example process of FIG. 6 is described herein with reference to the components of FIGS. 1 and/or 3. Further for explanatory purposes, the blocks of the example process of FIG. 6 are described herein as occurring in series, or linearly. However, multiple blocks of the example process of FIG. 6 may occur in parallel. In addition, the blocks of the example process of FIG. 6 need not be performed in the order shown and/or one or more of the blocks of the example process of FIG. 6 need not be performed.

In the depicted example flow diagram, at block 602 an electronic device such as electronic device 100 displays a request for user authorization from a user. Displaying the request for user authorization may include displaying a dialog box 116 with text 400, as described in connection with FIG. 4.

At block 604, while the request is displayed, the electronic device may identify at least one gaze location, such as a gaze location 202, of at least one eye of the user.

At block 606, the electronic device may determine, based on the at least one gaze location, whether the displayed request for authorization has been viewed by the user. Determining, based on the at least one gaze location, whether the displayed request for authorization has been viewed by the user may include determining whether the at least one gaze location 202 is within a boundary of the displayed request (e.g., within a boundary of dialog box 116 or within a boundary of a text portion of dialog box 116) for at least a predetermined period of time.

At block 608, the electronic device may provide, if it is determined that the displayed request for authorization has been viewed by the user, a selectable option to provide the user authorization, such as selectable option 500 of FIG. 5. Providing the selectable option to provide the user authorization may include activating a deactivated option 406, or adding the selectable option to the displayed request after the determining. The process 600 may also include identifying, based on a multiple of gaze locations 202, a dwell of the at least one eye of the user on a user interface of an inactive application; and activating, based on the identified dwell, the inactive application.

As discussed above in connection with FIGS. 3 and 4, the displayed request for user authorization may include text 400 associated with the authorization. Determining, based on the at least one gaze location, whether the displayed request for authorization has been viewed by the user may include determining whether the at least one gaze location indicates that that user has read the text (e.g., based on multiple gaze locations over time that indicate reading movements of the user's eyes in connection with the text).

Figure 7:
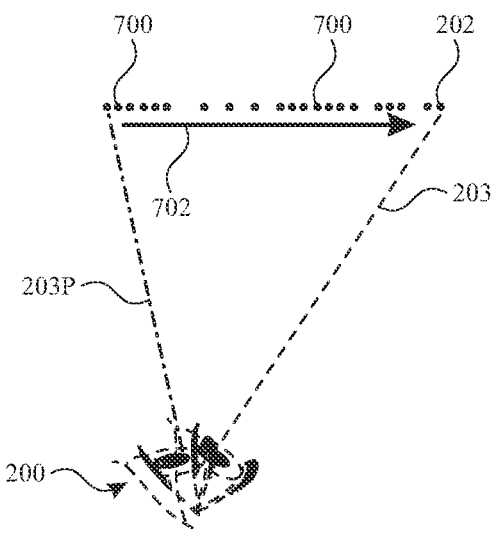
FIG. 7 illustrates an example of gaze locations that can be obtained over time in accordance with various aspects of the subject technology.
Figure 8:
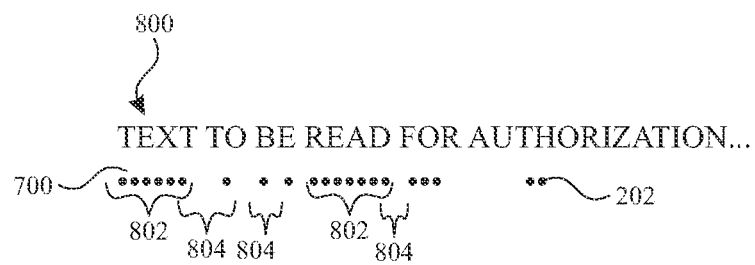
FIG. 8 illustrates gaze locations corresponding to reading eye movements in accordance with various aspects of the subject technology.

FIGS. 7 and 8 illustrate how multiple gaze locations 202, obtained over time, can indicate whether a user has read text 400. As shown in FIG. 7, as the eye of a user 200 rotates from a previous gaze direction 203P to a current gaze direction 203 during reading of text such as text 400, multiple gaze locations 700 that have been obtained prior to a current gaze location 202 over a period of time, as indicated by arrow 702, can fall along a substantially straight line. If it is determined that the substantially straight line of movement over time of gaze locations 700 correspond to a line of text 400 (e.g., fall along a line of text, the location of which is known due to the text being displayed by the device itself, or determined by the device using an image of the text in a physical document or displayed by another device), electronic device 100 may determine that that line of text has been read. However, FIG. 7 also indicates that the movement of gaze locations 700, over time as indicated by arrow 702, is not constant. This may be because, during reading, the human eye tends to move in a characteristic pattern of saccades and fixations.

FIG. 8 illustrates how groups 802 of gaze locations 700 may indicate relatively slow movements of the user's eye such as during fixations, and groups 804 of gaze locations 700 may indicate rapid movements of the user eye such as during saccades. Electronic device 100 may detect a characteristic pattern of saccades and fixations at locations corresponding to text 800 to be read for authorization (e.g., text 400 of FIGS. 4 and 5), and determine that the text at the corresponding locations has been read. In this example, electronic device 100 determines that at least one gaze location indicates that the user has read the text by determining that the at least one gaze location includes multiple time-separated gaze locations corresponding to reading eye movements (e.g., including at least one saccade and at least one fixation).

Figure 9:
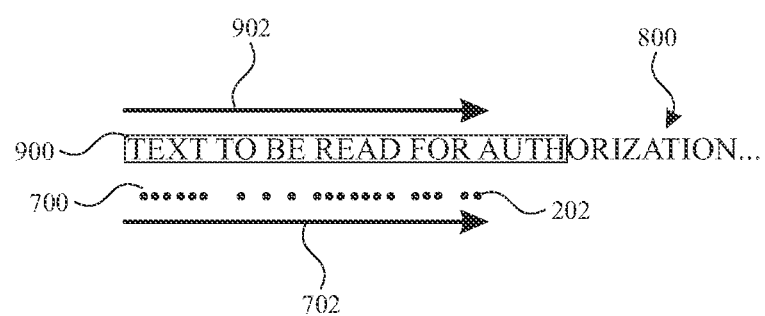
FIG. 9 illustrates an example of highlighting read text based on gaze locations in accordance with various aspects of the subject technology.

As shown in FIG. 9, in operational scenarios in which electronic device 100 determines (e.g., as multiple time-separated gaze locations move across portions of the text and/or based on detected reading eye movements at locations corresponding to displayed text) that text has been read, electronic device 100 may also display highlights 900 over portions of the text 800 that have been read. As indicated by arrow 902, the highlights 900 may expand over text 800 along with the reading movements of the current gaze location 202.

In some operational scenarios, electronic device 100 may identify a sound associated with a word (e.g., an animal sound associated with the name of an animal or a word that describes the animal sound, or the sound of the word spoken aloud in a particular language). In scenarios in which the gaze locations indicate which word is being read by a user (e.g., as in the examples of FIGS. 8 and 9), electronic device 100 can determine that the user is reading the word associated with the identified sound, and can output the identified sound (e.g., using one or more speakers or other audio output components) at the time the user is reading the word. This can be helpful when a child is learning to read, when a user is having difficulty reading a word, and/or when reading a story to a child.

Processing circuitry 306 may control other aspects of the operation of electronic device 100, including display 104, than those described in connection with FIGS. 4-9. For example, FIG. 10 illustrates an example in which application display window 114 displays a user interface 1000 of an application, and processing circuitry controls the user interface based on gaze locations of the user's eyes. In the example of FIG. 10, the user interface 1000 is a user interface for a media player application, and includes selectable control options including a play button 1002 and a stop button 1003. In this example, play button 1002 includes a play icon 1004, and text 1006 for indicating to the user that button 1002 and play icon 1004 are for initiating "PLAY" of media (e.g., audio, video, or other media) that can be accessed by the application corresponding to the displayed user interface. In this example, stop button 1003 includes a stop icon 1005, and text 1007 for indicating to the user that stop button 1003 and stop icon 1005 are operable to "STOP" the play of the media.

However, over time, the user may learn that play button 1002 and play icon 1004 are for playing the media, which can make text 1006 redundant and potentially an inefficient use of system resources to display. In some implementations, electronic device 100 determines that the user's gaze location 202 has fallen within the boundary of play button 1002 and/or that the user's gaze location 202 indicates that the user has read text 1006 a predetermined number of times.

FIG. 11 shows how, responsive to determining that the user's gaze location 202 has fallen within the boundary of play button 1002 and/or that the user's gaze location 202 indicates that the user has read text 1006 a predetermined number of times, the user interface 1000 in application display window 114 can be modified to remove text 1006. In this example, text 1007 remains a part of the user interface 1000 and the size of play icon 1004 is increased to take advantage of the display area available due to the removal of text 1006. However, in other implementations, instead of increasing the size of an icon associated with removed text, other portions of the user interface can expand or be modified to take advantage of the newly available space in the user interface.

For example, FIG. 12 illustrates a scenario in which text 1006 and text 1007 have both been viewed and/or read a sufficient number of times to remove the text, allowing other portions of user interface 1000 expand into additional space 1200 made available by the removal of the text 1006 and 1007.

It should be appreciated that, in some scenarios, text 1006 and/or 1007 can be removed based on gaze locations 202 that indicate that the user has stopped looking at the text (e.g., and only views icons 1004 and 1005) when operating buttons 1002 and 1003, rather than based on a number of views and/or reads of the text. It should also be appreciated that, although FIGS. 10-12 depict an example in which user interface 1000 includes buttons 1002 and 1003 and icons 1004 and 1005, the systems and methods described herein can be applied to remove substantially any text from a user interface after it is determined that the text has been viewed and/or read a sufficient number (e.g., a predetermined number) of times.

Figure 13:
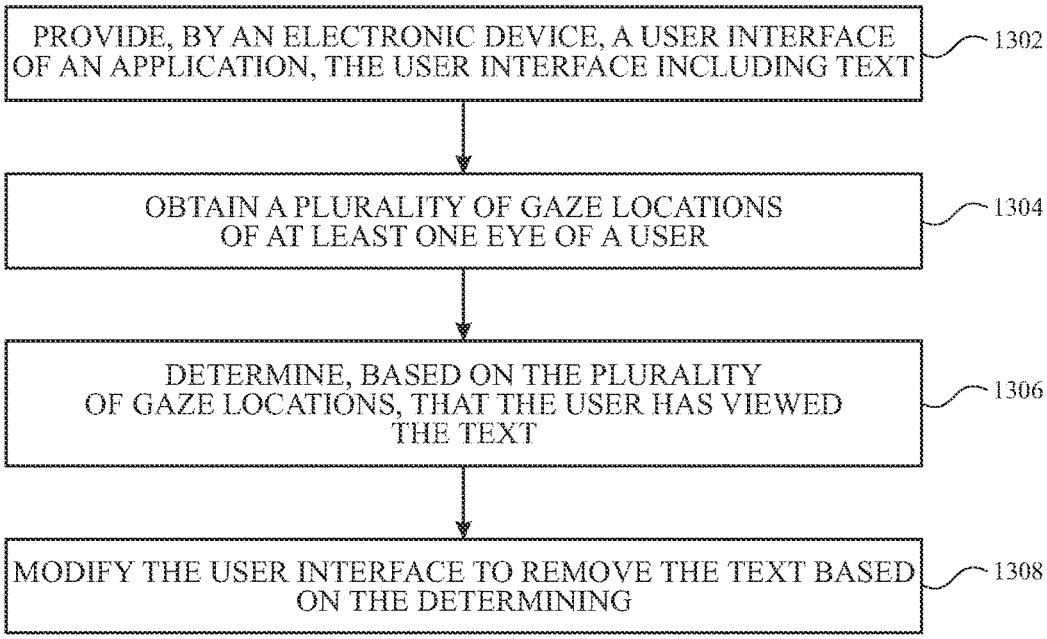
FIG. 13 illustrates a flow chart of an example process for gaze-based control of a user interface in accordance with various aspects of the subject technology.

FIG. 13 is depicts a flow diagram of an example process 1300 for gaze-based control of a user interface in accordance with various aspects of the subject technology. For explanatory purposes, the example process of FIG. 13 is described herein with reference to the components of FIGS. 1 and/or 3. Further for explanatory purposes, the blocks of the example process of FIG. 13 are described herein as occurring in series, or linearly. However, multiple blocks of the example process of FIG. 13 may occur in parallel. In addition, the blocks of the example process of FIG. 13 need not be performed in the order shown and/or one or more of the blocks of the example process of FIG. 13 need not be performed.

In the depicted example flow diagram, at block 1302, an electronic device such as electronic device 100 displays a user interface such as user interface 1000 of an application, the user interface including text such as text 1006 or 1007.

At block 1304, the device obtains multiple gaze locations of at least one eye of a user (e.g., using an eye tracking such as an eye tracker 310 formed from one or more cameras 105 and associated processing circuitry).

At block 1306, the electronic device may determine, based on the multiple gaze locations, that the user has viewed the text, e.g., that the user's eyes have dwelled on the text for at least a predetermined period of time, and/or that the user has read each of the words and/or characters of the text. Determining that the user has viewed the text may include determining that the user has viewed the text at least a predetermined number of times.

At block 1308, the electronic device modifies the user interface to remove the text based on the determining. As described in connection with the example of FIGS. 10-12, the user interface can include an icon (e.g., one or more icons such as icons 1004 and 1005) associated with the text, and modifying the user interface to remove the text may include providing the icon without the text as illustrated in the examples of FIGS. 11 and 12.

In some operational scenarios, a user interface or a user interface element (e.g., a widget) can be displayed (e.g., by display 104 of electronic device 100) to provide time-dependent information to the user. Processing circuitry 306 may control the user interface or user interface element by adjusting a frequency at which the time-based information is updated based on a frequency with which the user views the user interface or user interface element.

Figure 14:
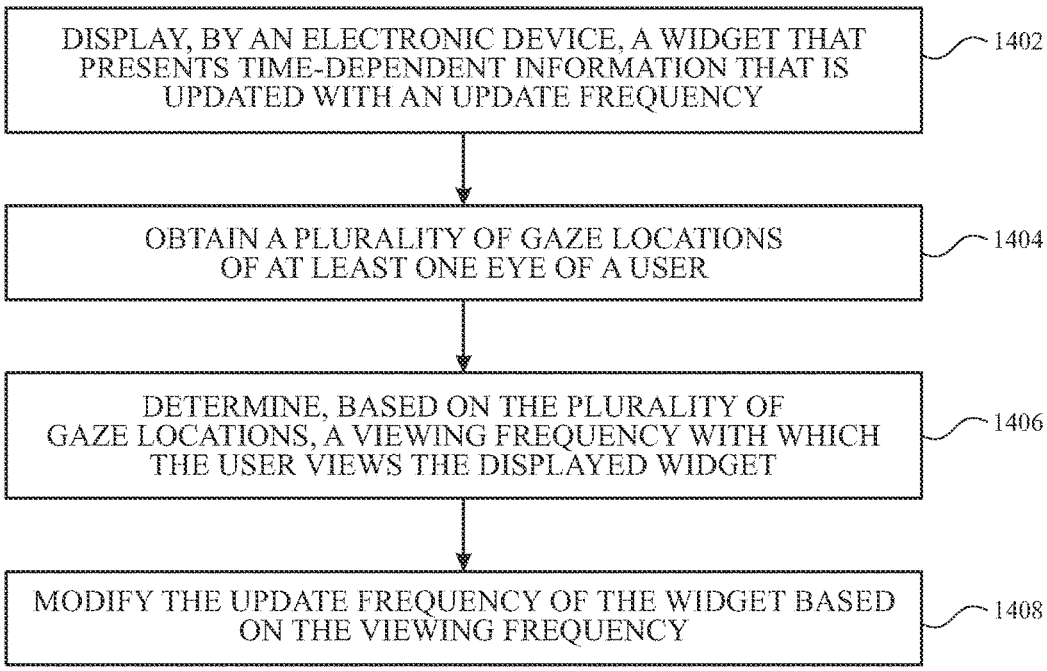
FIG. 14 illustrates a flow chart of an example process for gaze-based control of a user interface element that displays time-dependent information in accordance with various aspects of the subject technology.

FIG. 14 is depicts a flow diagram of an example process 1400 for gaze-based control of a user interface or user interface element that displays time-dependent information in accordance with various aspects of the subject technology. For explanatory purposes, the example process of FIG. 14 is described herein with reference to the components of FIGS. 1 and/or 3. Further for explanatory purposes, the blocks of the example process of FIG. 14 are described herein as occurring in series, or linearly. However, multiple blocks of the example process of FIG. 14 may occur in parallel. In addition, the blocks of the example process of FIG. 14 need not be performed in the order shown and/or one or more of the blocks of the example process of FIG. 14 need not be performed.

In the depicted example flow diagram, at block 1402, an electronic device such as electronic device 100 displays a widget (e.g., user interface element 118 of FIGS. 1 and 2) that presents time-dependent information that is updated with an update frequency. The time-dependent information can include one or more of weather information, financial information, news feed information, calendar information, time information, or any other information that changes with time. The updates may initially be performed at a default update frequency, and may include obtaining new information from data locally stored on the device and/or from one or more remote devices or servers over a network such as the Internet. Obtaining the updated information can consume power, processing time, and network bandwidth. It would be desirable to be able to provide the updates prior to the user viewing the widget, without obtaining substantially more updates than are viewed by the user.

At block 1404, the electronic device may obtain multiple gaze locations 202 of at least one eye of a user. The multiple gaze locations may be obtained over a period of time, and may include gaze locations within a boundary of the widget (e.g., within a boundary of user interface element 118) that occur when the user looks at the widget.

At block 1406, the electronic device may determine based on the multiple gaze locations, a viewing frequency with which the user views the displayed widget. The viewing frequency may be determined, for example, by determining the number of views of the widget divided by the amount of time over which the views were identified.

At block 1408, the electronic device may modify the update frequency of the widget based on the viewing frequency. For example, the update frequency may be set to a frequency that is greater than the viewing frequency by a predetermined amount. In some operational scenarios, a user interface or a user interface element may be activated from an inactive state based on gaze locations that indicate a dwell (e.g., a static gaze location over a predetermined amount of time) of at least one eye of the user within the boundaries of the user interface or user interface element.

In the examples described herein, gaze locations have primarily been described as corresponding to an intersection of the user's gaze direction with a portion of display 104 of electronic device 100. However, it should also be appreciated that the systems and methods described herein can be applied to scenarios in which a user is viewing a physical document.

Figure 15:
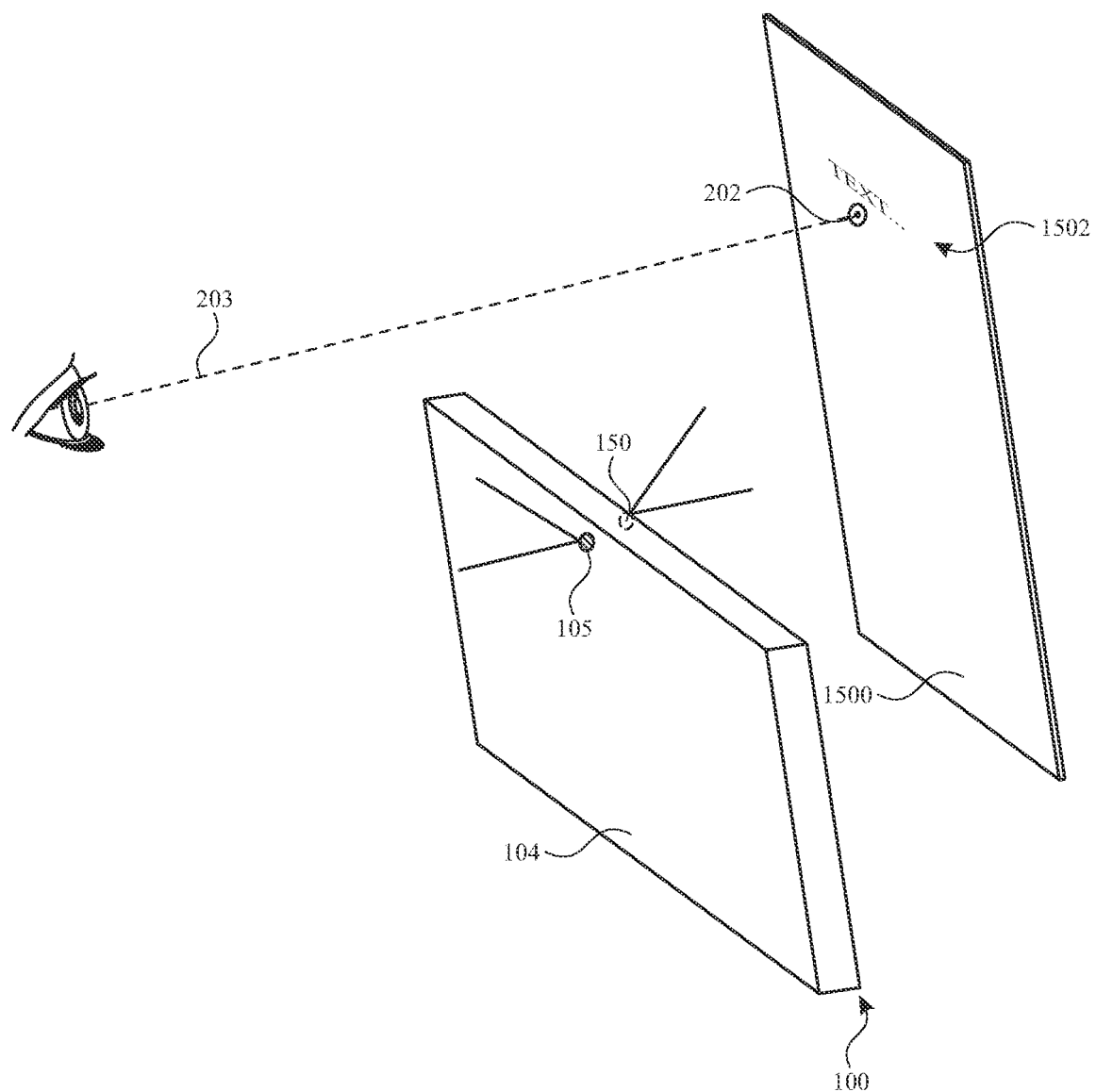
FIG. 15 illustrates an example electronic device configured to determine whether a physical document has been viewed and/or read in accordance with various aspects of the subject technology.

For example, FIG. 15 illustrates an example in which the user's gaze location 202 intersects text 1502 on a physical document 1500. In this example, a camera 150 of electronic device 100 captures an image of physical document 1500. Processing circuitry 306 may then determine the location of physical document 1500 relative to electronic device 100 based on the image and/or depth information captured by one or more sensors of the device. Processing circuitry may also determine that there is text 1502 on physical document 1500, determine the location of the text 1502, and/or recognize the text 1502 based on the image, in various examples.

An eye tracker (e.g., including camera 105) of electronic device 100 may determine the gaze direction 203 of the eye of a user 200, and determine that gaze location 202 is a location on physical document 1500 by determining the intersection location of gaze direction 203 and physical document 1500 using the determined position and/or distance of the physical document.

Figure 16:
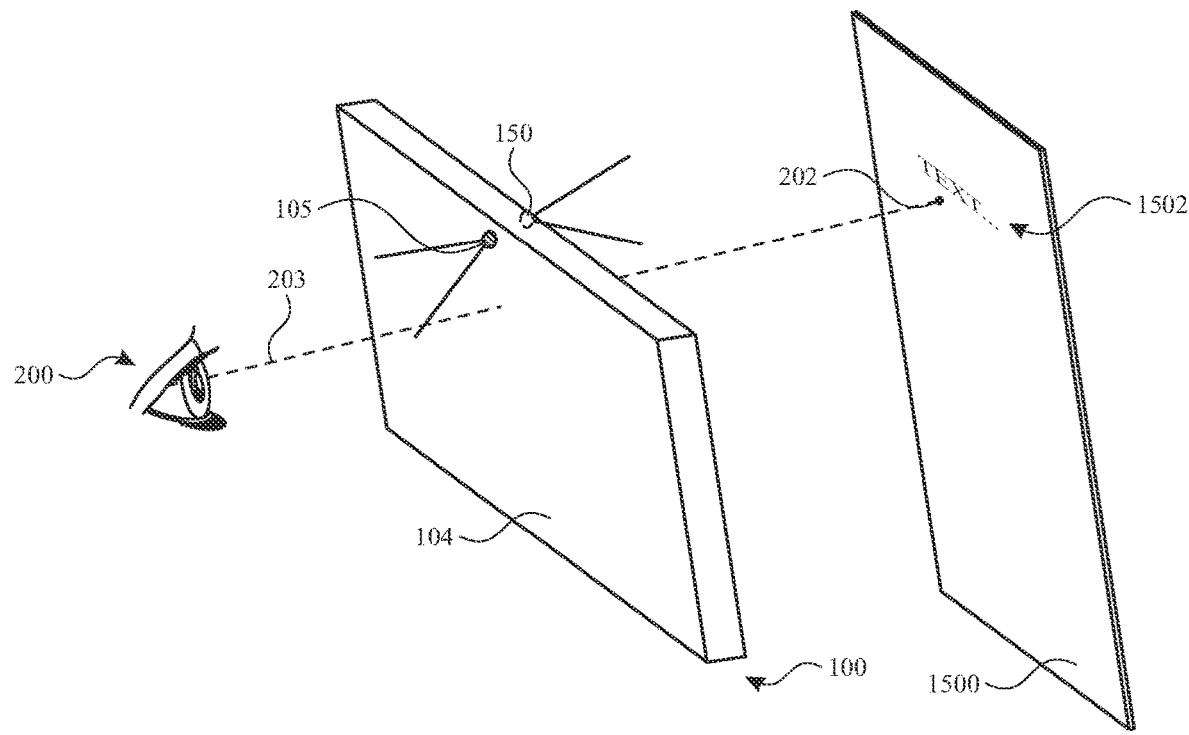
FIG. 16 illustrates an example electronic device having a transparent or translucent display and configured to determine whether a physical document has been viewed and/or read in accordance with various aspects of the subject technology.
Figure 17:
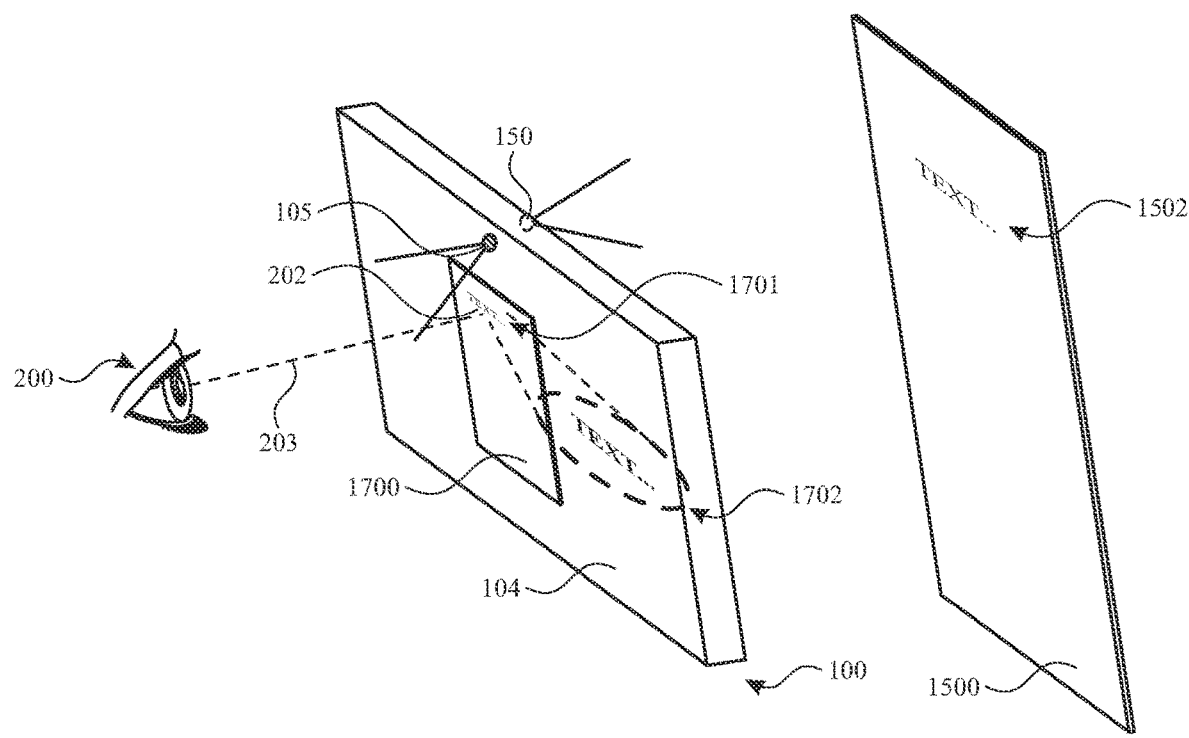
FIG. 17 illustrates an example electronic device having an opaque display and configured to determine whether a physical document has been viewed and/or read in accordance with various aspects of the subject technology.

Over time, electronic device 100 may determine multiple gaze locations 202, and may determine that the multiple gaze locations 202 indicate that the user is reading, or has read text 1502 (e.g., using some or all of the same techniques described in connection with electronic text in the example of FIGS. 7-9). In the example of FIG. 15, the user 200 views the physical document 1500 by looking past display 104. However, as indicated in FIGS. 16 and 17, respectively, user 200 may view the physical document 1500 by looking through a transparent or translucent display (FIG. 16) or by viewing an electronic version 1700 of the physical document 1500 that is displayed on an opaque display (e.g., using one or more images captured by camera 150, FIG. 17). Electronic version 1700 displayed by display 104 may include electronic text 1701 corresponding to the text 1502 of physical document 1500.

As indicated in FIG. 17, in some scenarios, electronic device 100 may detect (e.g., based one or more gaze locations and/or other information), that the user is having difficulty reading the text of an electronic or physical document. Based on this determination, electronic device 100 may provide a visual or audio enhancement to aid the user in reading the text. In the example of FIG. 16, the enhancement is a visual enhancement 1702 that represents a magnified view of the text 1701. Determining that the user is having a difficulty reading the text may include determining that the gaze locations have stopped moving across the text for a period of time that is longer than a fixation time, and/or determining (e.g., based on one or more images and/or depth information from camera 105 and/or one or more other sensors of electronic device 100) that the user is squinting.

Figure 18:
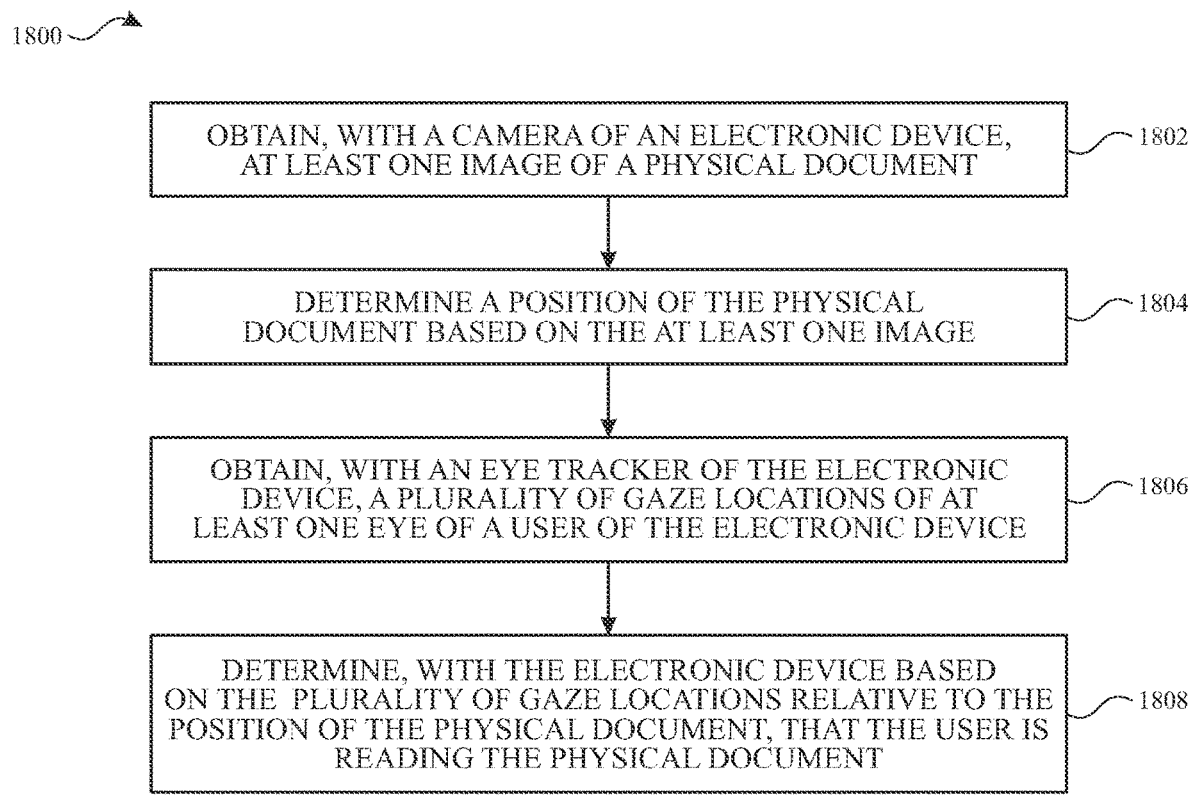
FIG. 18 illustrates a flow chart of an example process for gaze-based control of an electronic device based on a physical document in accordance with various aspects of the subject technology.

FIG. 18 is depicts a flow diagram of an example process 1800 for gaze-based control of an electronic device in connection with a physical document, in accordance with various aspects of the subject technology. For explanatory purposes, the example process of FIG. 18 is described herein with reference to the components of FIGS. 1 and/or 3. Further for explanatory purposes, the blocks of the example process of FIG. 18 are described herein as occurring in series, or linearly. However, multiple blocks of the example process of FIG. 18 may occur in parallel. In addition, the blocks of the example process of FIG. 18 need not be performed in the order shown and/or one or more of the blocks of the example process of FIG. 18 need not be performed.

In the depicted example flow diagram, at block 1802 at least one image of a physical document such as physical document 1500 can be obtained with a camera such as camera 150 of an electronic device such as electronic device 100.

At block 1804, the electronic device may determine a position of the physical document (e.g., relative to the electronic device) based on the at least one image (e.g., and/or based on additional information such as depth information from a sensor such as one of sensors 152). The electronic device may also identify, based on the at least one image, text in the physical document.

At block 1806, the electronic device may obtain, with an eye tracker (e.g., including camera 105 and associated circuitry) of the electronic device, a plurality of gaze locations 202 of at least one eye of a user 200 of the electronic device.

At block 1808, the electronic device may determine, based on the plurality of gaze locations relative to the position of the physical document, that the user is reading the physical document. The electronic device may also display, with a display such as display 104 of the electronic device and based on the plurality of gaze locations, highlights such as highlights 900 overlaid on a view of portions of the identified text that have been read by the user. In some examples, the view of the portions of the identified text may be a direct view through a translucent or transparent display as depicted in FIG. 16, and displaying the highlights may include displaying the highlights with the transparent or translucent display. In other examples, the electronic device may display the at least one image with the display of the electronic device as depicted in FIG. 17, and displaying the highlights may include displaying the highlights overlaid on the displayed at least one image.

As described above, one aspect of the present technology is the gathering and use of data available from specific and legitimate sources for determining whether a user has viewed and/or read textual information. The present disclosure contemplates that in some instances, this gathered data may include personal information data that uniquely identifies or can be used to identify a specific person. Such personal information data can include video data, three-dimensional geometry data, demographic data, location-based data, online identifiers, telephone numbers, email addresses, home addresses, data or records relating to a user's health or level of fitness (e.g., vital signs measurements, medication information, exercise information), date of birth, eye position or motion data, gaze tracking data, or any other personal information.

The present disclosure recognizes that the use of such personal information data, in the present technology, can be used to the benefit of users. For example, the personal information data can be used for determining whether a user has viewed and/or read textual information.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining whether a user has viewed and/or read textual information, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 19:
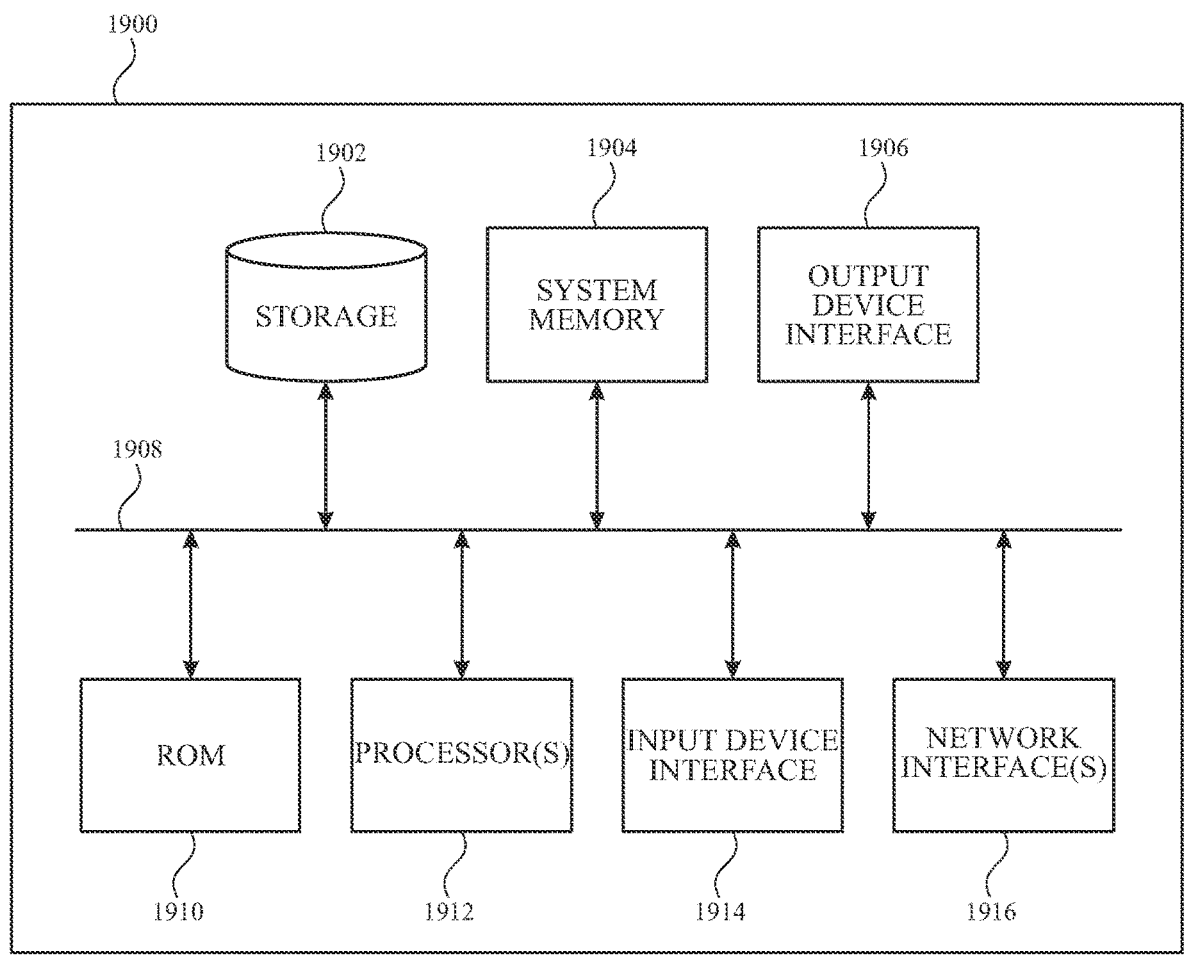
FIG. 19 illustrates an electronic system with which one or more implementations of the subject technology may be implemented.

FIG. 19 illustrates an electronic system 1900 with which one or more implementations of the subject technology may be implemented. The electronic system 1900 can be, and/or can be a part of, electronic device 100 shown in FIG. 1 and/or FIG. 3. The electronic system 1900 may include various types of computer readable media and interfaces for various other types of computer readable media. The electronic system 1900 includes a bus 1908, one or more processing unit(s) 1912 (e.g., including an implementation of processing circuitry 306 of FIG. 3), a system memory 1904 (and/or buffer), a ROM 1910, a permanent storage device 1902, an input device interface 1914, an output device interface 1906, and one or more network interfaces 1916, or subsets and variations thereof.

The bus 1908 collectively represents all system, peripheral, and chipset buses that communicatively connect the numerous internal devices of the electronic system 1900. In one or more implementations, the bus 1908 communicatively connects the one or more processing unit(s) 1912 with the ROM 1910, the system memory 1904, and the permanent storage device 1902. From these various memory units, the one or more processing unit(s) 1912 retrieves instructions to execute and data to process in order to execute the processes of the subject disclosure. The one or more processing unit(s) 1912 can be a single processor or a multi-core processor in different implementations.

The ROM 1910 stores static data and instructions that are needed by the one or more processing unit(s) 1912 and other modules of the electronic system 1900. The permanent storage device 1902, on the other hand, may be a read-and-write memory device. The permanent storage device 1902 may be a non-volatile memory unit that stores instructions and data even when the electronic system 1900 is off. In one or more implementations, a mass-storage device (such as a magnetic or optical disk and its corresponding disk drive) may be used as the permanent storage device 1902.

In one or more implementations, a removable storage device (such as a floppy disk, flash drive, and its corresponding disk drive) may be used as the permanent storage device 1902. Like the permanent storage device 1902, the system memory 1904 may be a read-and-write memory device. However, unlike the permanent storage device 1902, the system memory 1904 may be a volatile read-and-write memory, such as random access memory. The system memory 1904 may store any of the instructions and data that one or more processing unit(s) 1912 may need at runtime. In one or more implementations, the processes of the subject disclosure are stored in the system memory 1904, the permanent storage device 1902, and/or the ROM 1910. From these various memory units, the one or more processing unit(s) 1912 retrieves instructions to execute and data to process in order to execute the processes of one or more implementations.

The bus 1908 also connects to the input and output device interfaces 1914 and 1906. The input device interface 1914 enables a user to communicate information and select commands to the electronic system 1900. Input devices that may be used with the input device interface 1914 may include, for example, alphanumeric keyboards and pointing devices (also called "cursor control devices"). The output device interface 1906 may enable, for example, the display of images generated by electronic system 1900. Output devices that may be used with the output device interface 1906 may include, for example, a display such as display 104 of FIG. 1. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 19, the bus 1908 also couples the electronic system 1900 to one or more networks and/or to one or more network nodes, such as the electronic device 100 shown in FIG. 1, through the one or more network interface(s) 1916. In this manner, the electronic system 1900 can be a part of a network of computers (such as a LAN, a wide area network ("WAN"), or an Intranet, or a network of networks, such as the Internet. Any or all components of the electronic system 1900 can be used in conjunction with the subject disclosure.

In accordance with various aspects of the subject disclosure, a method is provided that includes displaying, by an electronic device, a request for user authorization from a user; identifying, while the request is displayed, at least one gaze location of at least one eye of the user; determining, based on the at least one gaze location, whether the displayed request for authorization has been viewed by the user; and providing, if it is determined that the displayed request for authorization has been viewed by the user, a selectable option to provide the user authorization.

In accordance with other aspects of the subject disclosure, a method is provided that includes providing, by an electronic device, a user interface of an application, the user interface including text; obtaining a plurality of gaze locations of at least one eye of a user; determining, based on the plurality of gaze locations, that the user has viewed the text; and modifying the user interface to remove the text based on the determining.

In accordance with other aspects of the subject disclosure, a method is provided that includes displaying, by an electronic device, a widget or user interface element that presents time-dependent information that is updated with an update frequency; obtaining a plurality of gaze locations of at least one eye of a user; determining, based on the plurality of gaze locations, a viewing frequency with which the user views the displayed widget or user interface element; and modifying the update frequency of the widget or user interface element based on the viewing frequency.

In accordance with other aspects of the subject disclosure, a method is provided that includes obtaining, with a camera of an electronic device, at least one image of a physical document; determining a position of the physical document based on the at least one image; obtaining, with an eye tracker of the electronic device, a plurality of gaze locations of at least one eye of a user of the electronic device; and determining, with the electronic device based on the plurality of gaze locations relative to the position of the physical document, that the user is reading the physical document.

In accordance with other aspects of the subject disclosure, an electronic device is provided that includes a display; an eye tracker configured to provide eye tracking data for at least one eye of a user; and processing circuitry configured to: provide, for display by the display, a request for user authorization from the user; identify, while the request is displayed, at least one gaze location based on the eye tracking data from the eye tracker; determine, based on the at least one gaze location, whether the displayed request for authorization has been viewed by the user; and provide, if it is determined that the displayed request for authorization has been viewed by the user, a selectable option to provide the user authorization.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:
    displaying, on a display of an electronic device, a request for user authorization from a user, wherein the displayed request includes text associated with the user authorization and the request for user authorization includes a request for user authorization for the electronic device to perform an action, the action comprising at least one of: a request to delete data from the electronic device, a request for user authorization to allow access to data stored by the electronic device, or a request for user authorization to allow access to a component of the electronic device;
    identifying, while the request is displayed, at least one gaze location of at least one eye of the user;
    determining, based on the at least one gaze location, whether the text in the displayed request for authorization has been viewed by the user, wherein the determination is at least in part based on determining whether the at least one gaze location corresponds to reading eye movement;
    in response to determining that the text in the displayed request for authorization has been viewed by the user, providing, for display, a selectable option to provide the user authorization, otherwise withholding providing, for display, the selectable option; and
    in response to selection of the selectable option, performing the action.

2. The method of claim 1, wherein determining, based on the at least one gaze location, whether the displayed request for authorization has been viewed by the user comprises determining whether the at least one gaze location is within a boundary of the displayed request for at least a predetermined period of time.

3. The method of claim 1, wherein the displayed request includes text associated with the authorization, and wherein determining, based on the at least one gaze location, whether the displayed request for authorization has been viewed by the user comprises determining whether the at least one gaze location indicates that that user has read the text.

4. The method of claim 3, wherein determining whether the at least one gaze location indicates that that user has read the text comprises determining that the at least one gaze location includes a plurality of time-separated gaze locations corresponding to reading eye movements.

5. The method of claim 4, wherein the reading eye movements comprise at least one saccade and at least one fixation.

6. The method of claim 4, further comprising highlighting portions of the text as the plurality of time-separated gaze locations corresponding to the reading eye movements move across the portions of the text.

7. The method of claim 1, wherein providing the selectable option to provide the user authorization comprises adding the selectable option to the displayed request after the determining.

8. The method of claim 1, wherein providing the selectable option to provide the user authorization comprises:
    providing, prior to the determining, a deactivated option to provide the user authorization; and
    activating the selectable option after the determining.

9. The method of claim 1, wherein the request for user authorization includes a selectable option to decline the authorization.

10. The method of claim 1, wherein the request for user authorization is a request for user authorization to accept terms and conditions in a document displayed by the electronic device.

11. An electronic device, comprising:
    a display;
    an eye tracker configured to provide eye tracking data for at least one eye of a user; and
    processing circuitry configured to:
        provide, for display by the display, a request for user authorization from the user, wherein the request for user authorization includes a request for user authorization for the electronic device to perform an action and the displayed request includes text that describes the action, the action comprising at least one of: a request to delete data from the electronic device, a request for user authorization to allow access to data stored by the electronic device, or a request for user authorization to allow access to a component of the electronic device;

identify, while the request is displayed, at least one gaze location based on the eye tracking data from the eye tracker;

determine, based on the at least one gaze location, whether the text in the displayed request for authorization that describes the action has been viewed by the user, wherein the determination is at least in part based on determining whether the at least one gaze location corresponds to reading eye movement;

in response to a determination that the text in the displayed request for authorization that describes the action has been viewed by the user, provide, for display, a selectable option to provide the user authorization for the electronic device to perform the action described by the text, otherwise withhold providing, for display, the selectable option to provide the user authorization for the electronic device to perform the action; and in response to selection of the selectable option, perform the action described by the text in the displayed request that was determined to have been viewed by the user.

12. The electronic device of claim 11, wherein to determine, based on the at least one gaze location, whether the displayed request for authorization has been viewed by the user comprises to determine whether the at least one gaze location is within a boundary of the displayed request for at least a predetermined period of time.

13. The electronic device of claim 11, wherein the displayed request includes text associated with the authorization, and wherein to determine, based on the at least one gaze location, whether the displayed request for authorization has been viewed by the user comprises to determine whether the at least one gaze location indicates that that user has read the text.

14. The electronic device of claim 13, wherein to determine whether the at least one gaze location indicates that that user has read the text comprises to determine that the at least one gaze location includes a plurality of time-separated gaze locations corresponding to reading eye movements.

15. The electronic device of claim 14, wherein the reading eye movements comprise at least one saccade and at least one fixation.

16. The electronic device of claim 14, wherein the processing circuitry is further configured to highlight portions of the text as the plurality of time-separated gaze locations corresponding to the reading eye movements move across the portions of the text.

17. The electronic device of claim 11, wherein to provide the selectable option to provide the user authorization comprises adding the selectable option to the displayed request after the determining.

18. The electronic device of claim 11, wherein to provide the selectable option to provide the user authorization comprises to:
provide, prior to the determining, a deactivated option to provide the user authorization; and
activate the selectable option after the determining.

19. The electronic device of claim 11, wherein the request for user authorization includes a selectable option to decline the authorization.

20. A computer-readable medium storing instructions that, when executed by one or more processors, cause the one or more processors to perform operations comprising:
displaying, by an electronic device, a request for user authorization from a user, wherein the displayed request includes text associated with the user authorization and the request for user authorization includes a request for user authorization for the electronic device to perform an action, the action comprising at least one of: a request to delete data from the electronic device, a request for user authorization to allow access to data stored by the electronic device, or a request for user authorization to allow access to a component of the electronic device;
identifying, while the request is displayed, at least one gaze location of at least one eye of the user;
determining, based on the at least one gaze location, whether the text in the displayed request for authorization has been viewed by the user, wherein the determination is at least in part based on determining whether the at least one gaze location corresponds to reading eye movement;
in response to determining that the text in the displayed request for authorization has been viewed by the user, providing, for display, a selectable option to provide the user authorization, otherwise withholding providing, for display, the selectable option; and
in response to selection of the selectable option, performing the action.

21. A system comprising:
a processor;
a display;
one or more sensors for detecting eye movement;
a computer-readable storage medium with instructions thereon, which cause the system to:
display, on the display, a request for user authorization from a user, wherein the displayed request includes text associated with the user authorization and the request for user authorization includes a request for user authorization to perform an action, the action comprising at least one of: a request to delete data from the system, a request for user authorization to allow access to data stored by the system, or a request for user authorization to allow access to a component of the system;
identify, while the request is displayed by the one or more sensors, at least one gaze location of at least one eye of the user;
determine, based on the at least one gaze location, whether the text in the displayed request for authorization has been viewed by the user, wherein the determination is at least in part based on determining whether the at least one gaze location corresponds to reading eye movement;
in response to a determination that the text in the displayed request for authorization has been viewed by the user, provide, for display, a selectable option to provide the user authorization, otherwise withhold providing, for display, the selectable option; and
in response to selection of the selectable option, perform the action.

22. A device comprising:
a display circuit configured to display a request for user authorization from a user, wherein the displayed request includes text associated with the user authorization and the request for user authorization includes a request for user authorization for the device to perform an action, the action comprising at least one of: a request to delete data from the device, a request for user authorization to allow access to data stored by the device, or a request for user authorization to allow access to a component of the device;

a gaze location identifying circuit configured to identify, while the request is displayed, at least one gaze location of at least one eye of the user;

a view determining circuit configured to determine, based on the at least one gaze location, whether the text in the displayed request for authorization has been viewed by the user, wherein the determination is at least in part based on determining whether the at least one gaze location corresponds to reading eye movement; and an option providing circuit configured to in response to a determination that the text in the displayed request for authorization has been viewed by the user, provide, for display, a selectable option to provide the user authorization, otherwise withhold providing, for display, the selectable option; and in response to selection of the selectable option, perform the action.

23. The computer-readable medium of claim 20, wherein determining whether the displayed request for authorization has been viewed by the user includes determining that the at least one gaze location includes a plurality of time-separated gaze locations corresponding to reading eye movements, wherein the reading eye movements comprise at least one saccade and at least one fixation, wherein the operations are further comprise highlighting portions of the text as the plurality of time-separated gaze locations corresponding to the reading eye movements move across the portions of the text.

24. The computer-readable medium of claim 20, wherein providing the selectable option to provide the user authorization comprises:

adding the selectable option to the displayed request; or activating a deactivated option already displayed prior to the determining.

25. The method of claim 1, wherein determining, based on the at least one gaze location, whether the displayed request for authorization has been viewed by the user comprises:

determining that the user is having difficulty reading the text associated with the request; and in response to determining that the user is having difficulty reading the text, providing at least one of a visual enhancement or an audio enhancement to aid the user in reading the text.

26. The electronic device of claim 11, wherein the processing circuitry is further configured to:

in response to a determination that the user is having difficulty reading the text associated with the request, provide a visual enhancement to aid the user in reading the text.

27. The computer-readable medium of claim 20, wherein determining, based on the at least one gaze location, whether the displayed request for authorization has been viewed by the user comprises:

determining that the user is having difficulty reading the text associated with the request; and in response to determining that the user is having difficulty reading the text, providing at least one of a visual enhancement or an audio enhancement to aid the user in reading the text.

28. The system of claim 21, wherein the instructions further cause the system to:

in response to a determination that the user is having difficulty reading the text associated with the request, provide a visual enhancement to aid the user in reading the text.

29. The device of claim 22, wherein the view determining circuit is further configured to:

in response to a determination that the user is having difficulty reading the text associated with the request, provide an audio enhancement to aid the user in reading the text.

* * * * *